_United States Patent_ [19]

Ranka et al.

[11] Patent Number: 4,647,612

[45] Date of Patent: Mar. 3, 1987

[54] POLYMER EMULSION PRODUCTS

[75] Inventors: Ajay I. Ranka, Allison Park; Suryya K. Das, Pittsburgh, both of Pa.

[73] Assignee: PPG Industries, Inc., Pittsburgh, Pa.

[21] Appl. No.: 814,458

[22] Filed: Dec. 30, 1985

[51] Int. Cl.[4] ............................................. C08L 41/00
[52] U.S. Cl. ..................... 524/458; 524/460; 524/811; 523/201
[58] Field of Search ............... 524/811, 458, 460; 523/201

[56] References Cited

U.S. PATENT DOCUMENTS

| | | | |
|---|---|---|---|
| 3,242,123 | 3/1966 | Mayfield et al. | 524/811 |
| 4,064,087 | 12/1977 | Das | 524/529 |
| 4,144,155 | 3/1979 | Araki et al. | 524/811 |
| 4,337,185 | 6/1982 | Wessling et al. | 524/458 |

FOREIGN PATENT DOCUMENTS

| | | | |
|---|---|---|---|
| 2508588 | 9/1975 | Fed. Rep. of Germany | 524/811 |
| 57-18713 | 1/1982 | Japan | 524/811 |
| 58-185604 | 10/1983 | Japan | 524/811 |

_Primary Examiner_—Joseph L. Schofer
_Assistant Examiner_—N. Sarofim
_Attorney, Agent, or Firm_—William J. Uhl

[57] ABSTRACT

Polymeric latices formed by free radical initiated polymerization of a polymerizable alpha, beta-ethylenically unsaturated monomer component which contains from 0.1 to less than 30 percent by weight of an epoxy group-containing alpha, beta-ethylenically unsaturated monomer in aqueous medium and in the presence of a salt of an acid group-containing polymer are disclosed. The resultant polymeric latices have higher molecular weights than polymeric latices prepared without the epoxy group-containing alpha, beta-ethylenically unsaturated monomer. The polymeric latices are useful as resinous binders in coating compositions where they provide for excellent adhesion and flexibility in the coating.

10 Claims, No Drawings

4,647,612

POLYMER EMULSION PRODUCTS

BACKGROUND OF THE INVENTION

1. Field of the Invention

The present invention relates to polymer latices and more particularly to polymer latices which are prepared by polymerizing alpha, beta-ethylenically unsaturated monomers or mixtures of such monomers in the presence of a polymeric surfactant.

2. Brief Description of the Prior Art

Polymer emulsion products are prepared by polymerizing under free radical initiated polymerization conditions a polymerizable alpha, beta-ethylenically unsaturated monomer in water and in the presence of a low molecular weight emulsifier. The resulting polymers are high molecular weight and have been found useful in many applications including coatings applications. However, the low molecular weight emulsifiers have also been found to adversely affect the water sensitivity and adhesion of coatings prepared from such latices. To overcome these problems, it is known in the prior art to polymerize the polymerizable alpha, beta-ethylenically unsaturated monomer component in the presence of a polymeric surfactant which overcomes many of the problems associated with a low molecular weight emulsifier.

In accordance with this invention, it has been found that if polymerization is conducted with a particular type of polymeric surfactant and with specific mixtures of polymerizable alpha, beta-ethylenically unsaturated monomers, greatly improved polymer emulsion products can be obtained.

SUMMARY OF THE INVENTION

This invention provides for a latex polymer which has been formed by free radical initiated polymerization of a polymerizable alpha, beta-ethylenically unsaturated monomer component in aqueous medium in the presence of the salt of an acid group-containing polymer. The polymerizable alpha, beta-ethylenically unsaturated monomer component is a mixture of monomers which contains from 0.1 to less than 30 percent by weight of an epoxy group-containing alpha, beta-ethylenically unsaturated monomer.

Although not intending to be bound by any theory, it is believed that the epoxy monomer provides for a high degree of grafting of the monomer component onto the carboxylic acid group-containing polymer backbone via epoxy-acid reaction. This provides for a higher molecular weight polymer with improved properties over similar polymers without this mechanism of grafting.

DETAILED DESCRIPTION

The alpha, beta-ethylenically unsaturated monomer component is a mixture of monomers which is capable of free radical initiated polymerization in aqueous medium. The monomer mixture contains from 0.1 to less than 30, preferably 1 to 20, more preferably from 1 to 10 percent by weight of an epoxy group-containing alpha, beta-ethylenically unsaturated monomer such as glycidyl acrylate, glycidyl methacrylate and allyl glycidyl ether. When the amount of epoxy group-containing monomer is less than 0.1 percent by weight, there is insufficient grafting of the monomers to the acid group-containing polymer. As a result, the molecular weight of the polymer is lower than desired and the properties of coating compositions formulated with the polymeric latices are poorer. When the amount of epoxy group-containing monomer is greater than 30 percent by weight, there are problems with coagulation of the latex.

The other monomer in the mixture is preferably selected from vinylidene halides, with chlorides and fluorides being preferred; alkyl acrylates and methacrylates, vinyl esters of organic acids and alkyl esters of maleic and fumaric acid.

Among the vinylidene halides which can be used are vinyl chloride, vinylidene chloride, vinyl fluoride, vinylidene fluoride, tetrafluoroethylene, hexafluoropropylene and mixtures thereof.

Among the alkyl acrylate and methacrylates which can be used are those which contain from 1 to 20 carbon atoms in the alkyl groups. Examples include methyl acrylate, ethyl acrylate, butyl acrylate, 2-ethylhexyl acrylate, methyl methacrylate, butyl methacrylate, 2-ethylhexyl methacrylate and the like.

Among the vinyl esters which can be used are vinyl acetate, vinyl versatate and vinyl propionate.

Among the esters of maleic and fumaric acid which can be used are dibutyl maleate and diethyl fumarate.

Besides the preferred comonomers mentioned above, other polymerizable alpha, beta-ethylenically unsaturated monomers can be used and include olefins such as ethylene and propylene; hydroxy functional monomers such as hydroxyalkyl esters of acrylic and methacrylic acid, for example, hydroxyethyl methacrylate and hydroxypropyl methacrylate; vinyl aromatic compounds such as styrene and vinyl toluene; vinyl ethers and ketones such as methyl vinyl ether and methyl vinyl ketone; conjugated dienes such as butadiene and isoprene; nitriles such as acrylonitrile; amides such as acrylamide and methacrylamide and alkoxyalkyl derivatives thereof such as N-butoxymethylmethacrylamide.

Since the epoxy group-containing vinyl monomer constitutes from 0.1 to less than 30, preferably from 1 to 20 percent by weight of the monomer component, the other monomer or monomers in the mixture constitute the remainder of the monomer component, that is, from greater than 70 to 99.9, preferably from 80 to 99 percent by weight, the percentage by weight being based on total weight of the monomer mixture. Preferably, at least 50 percent, more preferably from 60 to 99 percent by weight of the other monomers will be selected from the other preferred monomers with the vinylidene chlorides, fluorides and/or alkyl acrylates and methacrylates being the most preferred other monomers.

With regard to the amount of the alpha, beta-ethylenically unsaturated monomer component, it is usually used in amounts of from 5 to 95, preferably 25 to 75 percent by weight based on total weight of polymerizable alpha, beta-ethylenically unsaturated monomer component and salt of the acid group-containing polymer.

Among the acid-containing polymers which can be employed are virtually any acid-containing polymer which can be neutralized or partially neutralized with an appropriate basic compound to form a salt which can be dissolved or stably dispersed in the aqueous medium. Acid-containing polymers which may be employed include acid-containing acrylic polymers and copolymers, alkyd resins, polyester polymers and polyurethanes.

Acid-containing acrylic polymers are well known in the art and are prepared by polymerizing an unsaturated acid, preferably an alpha, beta-ethylenically unsaturated carboxylic acid with at least one other polymerizable monomer.

The unsaturated acid contains at least one polymerizable double bond and at least one acid group, preferably one $CH_2=C<$ group, one carboxylic acid group and containing from 3 to 12 carbon atoms. Examples of suitable unsaturated acids include acrylic acid, methacrylic acid, crotonic acid, itaconic acid and $C_1$ to $C_8$ alkyl half-esters of maleic acid and fumaric acid including mixtures of acids.

The other polymerizable monomer contains at least one polymerizable double bond, preferably one $CH_2=C<$ group. Examples of suitable polymerizable monomers include alkyl acrylates and methacrylates, vinylidene halides, vinyl esters and the other polymerizable alpha, beta-ethylenically unsaturated monomers mentioned above.

Polymerization of the monomers is usually conducted by organic solution polymerization techniques in the presence of a free radical initiator as is well known in the art.

The molecular weight of the resulting acid-containing acrylic polymers is usually between about 2000 to 50,000 on a number average molecular weight basis and the polymers have acid numbers of at least 50, usually between about 50 to 250.

Besides the acid-containing acrylic polymers, alkyd resins prepared by reacting an oil with a polycarboxylic acid or acid anhydride can also be used in the practice of the invention. Oils which may be used are drying oils which are esters of fatty acids which can be obtained from naturally occurring sources or by reacting a fatty acid with a polyol. Drying oils all contain at least a portion of polyunsaturated fatty acids.

Examples of suitable naturally occurring drying oils are linseed oil, soya oil, tung oil, tall oil esters, dehydrated caster oil, and the like.

The drying oils may also be obtained by reacting fatty acids with a polyol. Suitable fatty acids are oleic, linoleic and linolenic. Various polyols which can be used include butanediol, glycerol, trimethylolpropane, pentaerythritol and sorbitol. Also acid group-containing polyols such as dimethylolpropionic acid can be used. The drying oils can be modified with other acids including saturated, unsaturated or aromatic acids such as adipic acid, maleic acid, phthalic acid, or an anhydride of such an acid where it exists.

The polycarboxylic acid utilized in forming the alkyd can be an alpha, beta-ethylenically unsaturated dicarboxylic acid or its anhydride such as maleic acid, fumaric acid, itaconic acid, maleic anhydride and itaconic anhydride; an aromatic acid and a saturated dicarboxylic acid or their anhydrides where they exist such as phthalic acid, isophthalic acid, adipic acid, sebacic acid or the like. Mixtures of the same or different acids and anhydrides may also be utilized. Ordinarily, the acid and anhydride employed should contain from about 4 to about 10 carbon atoms, although longer chain compounds can be employed if desired.

In addition to acid-containing acrylic polymers and alkyd resins, conventional polyester resins formed by reacting a polyol and a polycarboxylic acid may be employed. Various polyols can be employed including ethylene glycol, propylene glycol, neopentyl glycol, glycerol, pentaerythritol, trimethylolpropane, and the like. Also acid group-containing polyols such as dimethylolpropionic acid can be used.

Various polycarboxylic acids may be employed including dicarboxylic acids such as phthalic acid, tetrahydrophthalic acid, hexahydrophthalic acid, maleic acid, itaconic acid, adipic acid, sebacic acid, and the like. Also, anhydrides of the polycarboxylic acids where they exist can be used.

The preparation of acid group-containing alkyd resins and polyesters is well known in the art and usually involves preparation in organic solvent with sufficient acid group-containing ingredients to form an acid group-containing material at the completion of the reaction.

In the case of alkyd and polyester polymers, a sufficient excess of the acid component is employed in forming the polymers to provide an acid value of from 10 to 120 with a preferred acid value being from 30 to 60.

Acid group-containing polyurethanes can also be used in the practice of the invention. These can be prepared by first preparing a polyurethane polyol and then reacting with a polycarboxylic acid or anhydride to introduce the necessary acid functionality into the polymer. Other examples of acid-containing polyurethanes are described in U.S. Pat. No. 3,479,310 to Dieterich et al and U.S. Pat. No. 4,147,679 to Scriven et al. The acid value of the polyurethane may range from 10 to 120, preferably 30 to 60.

The salt or partial salt of the acid-containing polymer is formed by neutralizing or partially neutralizing the acid groups of the polymer with an appropriate basic compound. Suitable basic compounds which may be utilized for this purpose include inorganic bases such as alkali metal hydroxides, for example, sodium or potassium hydroxide or organic bases such as ammonia or a water-soluble amine such as methylethanolamine or diethanolamine.

The degree of neutralization required to form the desired polymer salt may vary considerably depending upon the amount of acid included in the polymer, and the degree of solubility or dispersibility of the salt which is desired. Ordinarily in making the polymer water-dispersable, the acidity of the polymer is at least 25 percent neutralized with the water-soluble basic compound.

The amount of the salt of the acid group-containing polymer which is used in the polymerization is usually from 5 to 95, preferably 25 to 75 percent by weight based on total weight of polymerizable alpha, beta-ethylenically unsaturated monomer component and the salt of the acid group-containing polymer.

With regard to the conditions of polymerization, the polymerizable alpha, beta-ethylenically unsaturated monomer component is polymerized in aqueous medium with a free radical initiator and in the presence of the salt of the acid group-containing polymer. The temperature of polymerization is typically from about 0° C. to about 100° C., usually from about 20° to 85° C. and the pH of the aqueous medium is usually maintained from about 5 to about 12.

The free radical initiator can be selected from one or more peroxides which are known to act as free radical initiators and which are soluble in aqueous medium. Examples include the persulfates such as ammonium, sodium and potassium persulfate. Also, oil-soluble initiators may be employed either alone or in addition to the water-soluble initiators. Typical oil-soluble initiators include organic peroxides such as benzoyl peroxide, t-butyl hydroperoxide, and t-butyl perbenzoate. Azo compounds such as azobisisobutyronitrile can also be used.

The polymerization reaction may be conducted as batch, intermittent or a continuous operation. While all of the polymerization ingredients may be charged initially to the polymerization vessel, better results normally are obtained with proportioning techniques.

Typically, the reactor is charged with an appropriate amount of water, acid polymer salt and free radical initiator. The reactor is then heated to the free radical initiation temperature and charged with the monomer component. Preferably only water, initiator and part of the acid polymer salt and part of the monomer are initially charged to the reactor. After this initial charge has been allowed to react for a period of time, the remaining monomer component and acid polymer salt are added incrementally with the rate of addition being varied depending on the polymerization temperature, the particular initiator employed and the type and amount of monomers being polymerized. After all the monomer components have been charged, a final heating is usually done to complete polymerization. The reactor is then cooled and the latex recovered.

The following examples are submitted for the purpose of further illustrating the nature of the present invention and should not be construed as a limitation upon the scope thereof. Unless otherwise indicated, all parts and percentages in the examples are by weight.

EXAMPLES

The following examples, Examples A–G, show the preparations of salts of various carboxylic acid group-containing polymers which are used in subsequent examples for aqueous polymerization of vinyl monomer mixtures containing epoxy group-containing alpha, beta-ethylenically unsaturated monomers.

EXAMPLE A

A salt of a carboxylic acid group-containing acrylic polymer was prepared from the following mixture of ingredients:

| Ingredient | Parts by weight (in grams) |
| --- | --- |
| Feed A | |
| Acrylic acid | 160.9 |
| N—butoxymethylacrylamide | 201.3 (61.5% active in 75/25 butanol-xylene mixture) |
| Styrene | 121.3 |
| Ethyl acrylate | 831.7 |
| Feed X | |
| Benzoyl peroxide | 15.8 (78% active) |
| Methyl ethyl ketone | 70.0 |
| Toluene | 60.0 |
| Feeds B and C | |
| t-butyl perbenzoate | 6.0 |
| 2-butoxyethanol | 6.0 |

Butanol, 509 grams, was charged to a reactor and heated under a nitrogen atmosphere to reflux. Feeds A and X were added incrementally to refluxing butanol over a three-hour period. At the completion of the additions of Feeds A and X, Feed B was added and the reaction mixture held at reflux for two hours. Feed C was then added and the reaction mixture held at reflux for an additional two hours. The reaction mixture was then cooled and vacuum stripped (to remove any remaining unreacted monomers). The reaction mixture was then neutralized (54 percent total theoretical neutralization) by adding 73.5 grams of 28 percent aqueous ammonia and 73.5 grams of deionized water. The ammonia addition was beneath the surface and at a temperature of 68° C. The reaction mixture was held at 68° C. for 15 minutes followed by the addition of 1642.5 grams of deionized water. The reaction mixture was held at 70° C. for an additional 30 minutes and then cooled to room temperature. The resultant reaction mixture had a solids content (measured at 150° C.) of about 34 percent. The acrylic polymer had a weight average molecular weight (Mw) of 48,082 as determined by gel permeation chromatography using a polystyrene standard.

EXAMPLE B

A salt of a carboxylic acid group-containing acrylic polymer was prepared from the following mixture of ingredients.

| Ingredient | Parts by weight (in grams) |
| --- | --- |
| Initial Reactor Charge | |
| Butanol | 667.0 |
| Ethyl acetate | 351.0 |
| Feed A | |
| Ethyl acrylate | 1769.9 |
| Methyl methacrylate | 371.3 |
| Acrylic acid | 334.2 |
| Feed X | |
| Methyl ethyl ketone | 140.0 |
| Toluene | 120.0 |
| Benzoyl peroxide | 23.8 (78% active) |
| Feed B | |
| 28% aqueous ammonia | 225.5 |
| Deionized water | 147.0 |
| Feed C | |
| Deionized water | 3285.0 |
| Feed D | |
| Deionized water | 2400.0 |

The procedure for preparing the acrylic polymer, neutralizing the polymer and dispersing the acrylic polymer salt in water is as generally described in Example A. The resultant dispersion had a solid content of about 28 percent. The acrylic polymer had a Mw of 36,201.

EXAMPLE C

A salt of a carboxylic acid group-containing acrylic polymer similar to Example B was prepared from the following mixture of ingredients:

| Ingredient | Parts by weight (in grams) |
| --- | --- |
| Initial Reactor Charge | |
| Butanol | 667.0 |
| Ethyl acetate | 351.0 |
| Feed A | |
| Ethyl acrylate | 1769.9 |
| Acrylic acid | 334.2 |
| Methyl methacrylate | 371.3 |
| Feed A' | |
| Acrylic plasticizer | 423.1 |
| Feed B | |
| 28% aqueous ammonia | 225.5 |
| Deionized water | 147.0 |
| Feed C | |
| Deionized water | 3285.0 |
| Feed D | |
| Deionized water | 3000.0 |

The acrylic plasticizer was prepared from the following ingredients:

| Ingredient | Parts by weight (in grams) |
|---|---|
| Initial Reactor Charge | |
| Monobutylether of diethylene glycol | 600.0 |
| Butanol | 320.0 |
| Feed A | |
| Ethyl acrylate | 2111.0 |
| N—butoxymethylacrylamide | 184.6 |
| Methacrylic acid | 22.7 |
| Styrene | 22.7 |
| Feed X | |
| Monobutylether of diethylene glycol | 135.0 |
| t-butyl perbenzoate | 45.4 |
| Feeds B, C and D | |
| Monobutylether of diethylene glycol | 13.5 |
| t-butyl perbenzoate | 7.6 |

The initial reactor charge was heated to reflux under a nitrogen atmosphere. Feeds A and X were added incrementally over a three-hour period. At the completions of Feeds A and X, Feed B was added and the dropping funnels were rinsed with monobutylether of diethylene glycol (16.9 grams total) and the rinse added to the reaction mixture which was held at reflux for an additional 1½ hours, followed by the addition of Feeds C and D with a 1½ hour hold at reflux between additions. The reaction mixture was then cooled to room temperature. The reaction mixture had a solids content of 65.5 percent and had a Mw of 11,332.

The procedure for preparing the acrylic polymer of Example C was as generally described in Example A with the acrylic plasticizer (Feed A') being added after the addition of Feeds A and X. Neutralization and dispersion in water was generally described in Example A. The resultant dispersion had a solids content of about 27 percent. The acrylic polymer had a Mw of 37,072.

EXAMPLE D

A salt of a carboxylic acid group-containing acrylic polymer similar to Examples B and C was prepared from the following mixture of ingredients:

| Ingredient | Parts by weight (in grams) |
|---|---|
| Initial Reactor Charge | |
| Butanol | 1018.0 |
| Feed A | |
| Acrylic acid | 990.2 |
| Methyl methacrylate | 742.6 |
| Ethyl acrylate | 742.6 |
| Feed X | |
| Methyl ethyl ketone | 140.0 |
| Toluene | 120.0 |
| Benzoyl peroxide | 63.2 (78% active) |
| Feeds B and C | |
| 2-butoxyethanol | 12.0 |
| t-butyl perbenzoate | 12.0 |
| Feed D | |
| 28% aqueous ammonia | 710.8 |
| Deionized water | 147.0 |
| Feed E | |
| Deionized water | 3285.0 |

The procedure for preparing the acrylic polymer, neutralizing the polymer and dispersing the acrylic polymer salt in water is as generally described in Example A. The resultant dispersion had a solids content of about 35 percent. The polymer had a Mw of 25,642.

EXAMPLE E

A salt of a carboxylic acid group-containing acrylic polymer similar to Examples B, C and D was prepared from the following mixture of ingredients:

| Ingredient | Parts by weight (in grams) |
|---|---|
| Initial Reactor Charge | |
| Butanol | 458.1 |
| Feed A | |
| Ethyl acrylate | 746.3 |
| Acrylic acid | 200.6 |
| Methyl methacrylate | 167.1 |
| Feed X | |
| Methyl ethyl ketone | 63.0 |
| Toluene | 54.0 |
| Benzoyl peroxide | 14.2 |
| Feeds B and C | |
| 2-butoxyethanol | 5.4 |
| t-butyl perbenzoate | 5.4 |
| Feed D | |
| 28% aqueous ammonia | 84.6 |
| Deionized water | 1600.0 |
| Feed E | |
| Deionized water | 1600.0 |

The procedure for preparing the acrylic polymer, neutralizing the polymer and dispersing the acrylic polymer salt in water was as generally described in Example A. The resultant dispersion had a solids content of about 35 percent. The polymer had a Mw of 13,535.

EXAMPLE F

A salt of a carboxylic acid group-containing polyurethane was prepared from the following mixture of ingredients:

| Ingredient | Parts by weight (in grams) |
|---|---|
| Initial Reactor Charge | |
| Polyurethane polyol | 644.3 (500 grams solids) |
| Hexahydrophthalic anhydride | 142.9 |
| Feed II | |
| Butanol | 160.7 |
| Feed III | |
| 28% aqueous ammonia | 45.0 |
| Deionized water | 81.1 |
| Feed IV | |
| Deionized water | 677.6 |

The polyurethane polyol was prepared by condensing trimethylhexamethylene diisocyanate with neopentyl glycol hexahydrophthalate and 1,6-hexanediol (25.67/49.84/24.49) weight ratio. The polyurethane dissolved in methyl isobutyl ketone had a solids content of 77.6 percent and a hydroxyl value of 80.73.

The carboxylic acid group-containing polyurethane was prepared by heating the initial reactor charge to 120° C. and holding at this temperature until the disppearance of anhydride groups as determined by Infra Red (IR) analysis. The methyl isobutyl ketone was vacuum stripped followed by the addition of Feed II. The reaction mixture was cooled to 70° C. followed by the addition of Feed III beneath the surface of the reaction mixture. The reaction mixture was then diluted with Feed IV. The resultant dispersion had a solids content of about 40.7 percent.

EXAMPLE G

A salt of a carboxylic acid group-containing alkyd resin was prepared as follows: A mixture of 581 grams of conjugated tall oil fatty acid (PAMOLYN 300 from Hercules Chemical Co.), 223.5 grams of isophthalic anhydride, 31 grams of xylene and 1.5 grams of dibutyl tin oxide were charged to a reaction vessel and heated to reflux to a stalled acid value (i.e. acid value of 2.6 to 2.8 as 85 percent by weight solution in dipropylene glycol monomethyl ether). The reaction mixture was cooled to 180° C. and 65 grams of maleic anhydride added. The reaction mixture was held for three hours at 200° C., cooled to 90° C., followed by the addition of 50 grams of water and the reaction mixture held at 93° C. until the disappearance of anhydride functionality as determined by IR. The reaction mixture was sparged with nitrogen for 15 minutes followed by the addition of 100 grams of diethylene glycol monobutyl ether. The reaction mixture was cooled to 50° C. and 90 grams of 28 percent aqueous ammonia and 50 grams of diethylene glycol monobutyl ether added. A mixture of 1400 grams of deionized water and 220 grams of diethylene glycol monobutyl ether was then added dropwise to the reaction mixture with vigorous stirring to solubilize the resin. The resin had a solids content of about 34 percent and an acid value of 23.0.

EXAMPLES 1-6

The following Examples 1-6 show the preparation, by aqueous latex polymerization techniques, of various vinyl chloride polymers and copolymers with glycidyl methacrylate and methyl methacrylate in the presence of salts of carboxylic acid group-containing acrylic polymers of Example A. The examples show the importance of polymerizing the vinyl chloride with small amounts of epoxy group-containing alpha, beta-ethylenically unsaturated monomers.

For all the examples, the polymerizations were conducted in a sealed reactor equipped with an agitator, a means for heating, cooling and purging with inert gas. In general, a reactor charge comprising a dispersion of the acrylic polymer salt and deionized water was first charged to the reactor, followed by the incremental addition of the monomers and the catalyst. The monomers were added to the reactor neat. When the pressure increased to about 150 psig, the monomer addition was stopped until the pressure decreased and then monomer addition was continued.

EXAMPLE 1

In this example, vinyl chloride was homopolymerized in the presence of the acrylic polymer salt of Example A as follows:

| Ingredient | Parts by Weight (in grams) |
| --- | --- |
| Reactor Charge | |
| Acrylic polymer salt of Example A | 1500 (33% solids) |
| Deionized water | 1200 |
| Monomer Cnarge | |
| Vinyl chloride | 495 |
| Catalyst Charge | |
| Ammonium persulfate | 8 |
| Deionized water | 72 |

The reactor charge was added to the reactor and heated to 70° C. over 20 minutes. Seventy (70) grams of the catalyst solution was then added to the reactor and the vinyl chloride monomer was added slowly (200 grams/hour) and incrementally to the reactor while maintaining the pressure below 150 psig. The vinyl chloride addition was completed in 5½ hours with intermittent stops because of excessive pressure build-up in the reactor. If addition were continuous, the vinyl chloride addition would have been completed in about 2½ hours. Also, duing addition of the vinyl chloride, 10 grams of catalyst solution were added. After completion of the vinyl chloride addition, the temperature of the reactor was then raised to 78° C. and held at this temperature for about 2 hours to complete the polymerization. The latex was cooled to room temperature, the reactor vented and the latex removed from the reactor and vacuum stripped to remove residual vinyl chloride. The properties of the latex are reported in Table I below.

EXAMPLE 2

In this example, 90 percent by weight vinyl chloride was copolymerized with 10 percent by weight glycidyl methacrylate as follows:

| Ingredient | Parts by Weight (in grams) |
| --- | --- |
| Reactor Charge | |
| Acrylic polymer salt of Example A | 1200 (33% solids) |
| Deionized water | 960 |
| Vinyl Monomer Charge | |
| Vinyl chloride | 356.4 |
| Glycidyl methacrylate | 39.6 |
| Catalyst Charge | |
| Deionized water | 63 |
| Ammonium persulfate | 7 |

The reactor charge was added to the reactor and heated to 70° C. over a 20-minute period. As the reactor charge was being heated, the catalyst charge was added incrementally at the rate of 200 grams per hour. After the catalyst charge was added, the vinyl chloride monomer was then added continuously to the reactor at the rate of 200 grams per hour and the glycidyl methacrylate was added at 22.5 grams per hour. The addition of the monomers was continuous with the pressure in the reactor increasing to 140 psig but not exceeding 150 psig. At the time the monomer feeds were completed, the pressure had dropped to 100 psig. The temperature of the reactor was then increased to 78° C. and held for about 2 hours to complete the polymerization. The latex was cooled to room temperature and recovered as described in Example 1. The properties of the latex are reported in Table I below.

EXAMPLE 3

In this example, 95 percent by weight vinyl chloride was copolymerized with 5 percent by weight glycidyl methacrylate as follows:

| Ingredient | Parts by Weight (in grams) |
| --- | --- |
| Reactor Charge | |
| Acrylic polymer salt of Example A | 1457.5 (25.7% solids) |
| Deionized water | 702.5 |
| Vinyl Monomer Charge | |
| Vinyl chloride | 376.2 |
| Glycidyl methacrylate | 19.8 |
| Catalyst Charge | |
| Deionized water | 63 |

-continued

| Ingredient | Parts by Weight (in grams) |
|---|---|
| Ammonium persulfate | 7 |

The latex was prepared as generally described above in Example 2 with the exception that the glycidyl methacrylate was added at the rate of 100 grams per hour. The properties of the latex are reported in Table I below.

EXAMPLE 4

In this example, 98 percent by weight vinyl chloride was copolymerized with 2 percent by weight glycidyl methacrylate as follows:

| Ingredient | Parts by Weight (in grams) |
|---|---|
| Reactor Charge | |
| Acrylic polymer salt of Example A | 1457.5 (25.7% solids) |
| Deionized water | 702.5 |
| Vinyl Monomer Charge | |
| Vinyl chloride | 388.08 |
| Glycidyl methacrylate | 7.92 |
| Catalyst Charge | |
| Deionized water | 63 |
| Ammonium persulfate | 7 |

The latex was prepared as generally described above in Example 3. The properties of the latex are reported in Table I below.

EXAMPLE 5

In this example, 99 percent by weight vinyl chloride was copolymerized with 1 percent by weight glycidyl methacrylate as follows:

| Ingredient | Parts by Weight (in grams) |
|---|---|
| Reactor Charge | |
| Acrylic polymer salt of Example A | 1457.5 (25.7% solids) |
| Deionized water | 702.5 |
| Vinyl Monomer Charge | |
| Vinyl chloride | 392.02 |
| Glycidyl methacrylate | 3.96 |
| Catalyst Charge | |
| Deionized water | 63 |
| Ammonium persulfate | 7 |

The latex was prepared as generally described above in Example 3. The properties of the latex are reported in Table I below.

EXAMPLE 6

In this example, 99.5 percent by weight vinyl chloride was copolymerized with 0.5 percent by weight glycidyl methacrylate as follows:

| Ingredient | Parts by Weight (in grams) |
|---|---|
| Reactor Charge | |
| Acrylic polymer salt of Example A | 1457.5 (25.7% solids) |
| Deionized water | 702.5 |
| Vinyl Monomer Charge | |
| Vinyl chloride | 394 |
| Glycidyl methacrylate | 1.98 |
| Catalyst Charge | |
| Deionized water | 63 |
| Ammonium persulfate | 7 |

The latex was prepared as generally described above in Example 3. The properties of the latex are reported in Table I below.

EXAMPLE 7

In this example, 90 percent by weight of vinyl chloride was copolymerized with 10 percent by weight methyl methacrylate in the presence of the salt of the acrylic polymer of Example A as follows:

| Ingredient | Parts by Weight (in grams) |
|---|---|
| Reactor Charge | |
| Acrylic polymer salt of Example A | 1200 (33% solids) |
| Deionized water | 960 |
| Monomer Charge | |
| Vinyl chloride | 356.4 |
| Methyl methacrylate | 39.6 |
| Catalyst Charge | |
| Ammonium persulfate | 7 |
| Deionized water | 63 |

The latex was prepared as generally described in Example 2 above with the exception that methyl methacrylate was used in place of glycidyl methacrylate.

The properties of the latex are reported in Table I below.

TABLE I

Latex Properties of Examples 1–7

| Example No. | % by Weight Vinyl Chloride | % by Weight Glycidyl Methacrylate | % by Weight Methyl Methacrylate | Condition of Latex | % Solids[1] | Weight Average Molecular Weight[2] | Film Properties[3] | |
|---|---|---|---|---|---|---|---|---|
| | | | | | | | Appearance[4] | Wedge Bend[5] |
| 1 | 100 | 0 | 0 | good | 30.3 | 39,432 | cloudy | complete delamination |
| 2 | 90 | 10 | 0 | good | 32.4 | 27,606 (soluable fraction) | clear | 67 mm |
| 3 | 95 | 5 | 0 | good | 29.8 | $2.1 \times 10^6$ | clear | 29 mm |
| 4 | 98 | 2 | 0 | slight coagulum | 29.5 | $2.3 \times 10^6$ | clear | 11 mm |
| 5 | 99 | 1 | 0 | slight coagulum | 29.6 | 41,804 | clear | 15 mm |
| 6 | 99.5 | 0.5 | 0 | slight coagulum | 29.2 | $5.9 \times 10^5$ | slightly cloudy | 10 mm |

TABLE I-continued

Latex Properties of Examples 1-7

| Example No. | % by Weight Vinyl Chloride | % by Weight Glycidyl Methacrylate | % by Weight Methyl Methacrylate | Condition of Latex | % Solids[1] | Weight Average Molecular Weight[2] | Film Properties[3] | |
|---|---|---|---|---|---|---|---|---|
| | | | | | | | Appearance[4] | Wedge Bend[5] |
| 7 | 90 | 0 | 10 | good | 32.1 | 56,449 | cloudy | complete delamination |

[1]Percent solids measured at 110° C.
[2]Weight average molecular weight determined by gel permeation chromatography using polystyrene standard.
[3]Latices were formulated with dimethylethanolamine and the viscosity adjusted with water to 35 seconds as measured with a No. 4 Ford cup.
[4]The latices were drawn down over aluminum panels and then cured by heating to a peak metal temperature of 420° F. (216° C.) in 25 seconds to form films having a dry film thickness of about 0.35 mils. The appearance of the cured film was noted.
[5]The wedge bend test is conducted by first coating a 4½ × 1¼ inch aluminum panel and bending the coated panel in the long direction over a ¼ inch mandrel. The folded panel is then impacted (2000 gram weight dropped 12 inches) to form a wedge shaped bend, i.e., flat at one end, ¼ inch at the other end. The test panel is then immersed in an artificially sweetened citric acid flavored soft drink for 2 minutes. The crack in the film measured from the flat end in millimeters (mm) is recorded.

The results of the experiments summarized in Table I above show that by the increase in molecular weight of Examples 3-6 over Example 1 and 7, a graft copolymer is probably being formed. Although the molecular weight of the Example 2 is low, it was observed that this example had a high level of insoluble material which was filtered and not measured in the molecular weight determination. This high molecular weight insoluble fraction is also evidence of high levels of grafting.

The film properties also evidence increased levels of grafting with increasing glycidyl methacrylate levels. Clearer films and better wedge bend results indicate the formation of a more uniform high molecular weight graft copolymer.

EXAMPLES 8-14

The following Examples 8-14 show copolymerizing vinyl chloride, vinyl acetate and glycidyl methacrylate in which increasing amounts of glycidyl methacrylate and correspondingly decreasing amounts of vinyl chloride were used. The examples show the adverse effects of using too much glycidyl methacrylate. The examples were prepared in the reactor and in the manner generally described for Examples 1-6 above with the exception that the vinyl monomers were pre-emulsified with the acrylic polymer salt of Examples B and C in deionized water prior to polymerization.

EXAMPLE 8

In this example, 89.5 percent by weight vinyl chloride was copolymerized with 0.5 percent by weight glycidyl methacrylate and 10 percent by weight vinyl acetate as follows:

| Ingredient | Parts by Weight (in grams) |
|---|---|
| Reactor Charge | |
| Ammonium persulfate | 4.28 |
| Deionized water | 500 |
| Pre-Emulsified Monomer Charge | |
| Acrylic polymer salt of Example B | 1200.2 (33.7% solids) |
| Vinyl acetate | 94.3 |
| Glycidyl methacrylate | 4.71 |
| Deionized water | 1156.20 |
| Vinyl chloride | 844.2 |

The vinyl acetate and glycidyl methacrylate were first pre-emulsified by adding them to a solution of the acrylic polymer and deionized water. The vinyl chloride was then pumped into the tank containing the pre-emulsified vinyl acetate and glycidyl methacrylate. When all the vinyl chloride had been pumped into the tank containing the other pre-emulsified monomers, 400 grams of the pre-emulsified monomer charge were then added to the reactor along with the reactor charge. The ingredients in the reactor were heated to 70° C. over 20 minutes, followed by the incremental addition of 2600 grams of the remaining pre-emulsified monomer charge which was completed in a period of about 3 hours. During the addition of the pre-emulsified monomer charge, the temperature of the reactor was kept at 70° C. and the pressure remained below 85 psig. At the completion of the pre-emulsified monomer charge, the reactor was heated to 78° C. and held for 2 hours to complete the polymerization. The resulting latex was then cooled and recovered as described in Example 1. The properties of the latex are reported in Table II below.

EXAMPLE 9

In this example, 87 percent by weight vinyl chloride was copolymerized with 10 percent by weight vinyl acetate and 3 percent by weight glycidyl methacrylate as follows:

| Ingredient | Parts by Weight (in grams) |
|---|---|
| Reactor Charge | |
| Deionized water | 500 |
| Ammonium persulfate | 4.04 |
| Pre-Emulsified Monomer Charge | |
| Acrylic polymer salt of Example B | 1241.93 (27.9% solids) |
| Vinyl acetate | 80.85 |
| Glycidyl methacrylate | 24.25 |
| Deionized water | 1229.50 |
| Vinyl chloride | 703.4 |

The latex was prepared as generally described above in Example 8. The properties of the latex are reported in Table II below.

EXAMPLE 10

In this example, 85 percent by weight vinyl chloride was copolymerized with 10 percent by weight vinyl acetate and 5 percent by weight glycidyl methacrylate as follows:

| Ingredient | Parts by Weight (in grams) |
|---|---|
| Reactor Charge | |
| Deionized water | 571.4 |
| Ammonium persulfate | 4.4 |
| Pre-Emulsified Monomer Charge | |
| Acrylic polymer salt of Example C | 1491.52 (27.5% solids) |
| Vinyl acetate | 88.0 |
| Glycidyl methacrylate | 44.0 |
| Deionized water | 1408.0 |
| Vinyl chloride | 748.0 |

The latex was prepared as generally described above in Example 8. The properties of the latex are reported in Table II below.

EXAMPLE 11

In this example, 80 percent by weight vinyl chloride was copolymerized with 10 percent by weight vinyl acetate and 10 percent by weight glycidyl methacrylate as follows:

| Ingredient | Parts by Weight (in grams) |
|---|---|
| Reactor Charge | |
| Deionized water | 500.0 |
| Ammonium persulfate | 4.28 |
| Pre-Emulsified Monomer Charge | |
| Acrylic polymer salt of Example B | 1199.5 (33.7% solids) |
| Vinyl acetate | 94.32 |
| Glycidyl methacrylate | 94.32 |
| Deionized water | 1166.8 |
| Vinyl chloride | 754.6 |

The latex was prepared as generally described above in Example 8. The properties of the latex are reported in Table II below.

EXAMPLE 12

In this example, 70 percent by weight vinyl chloride was copolymerized with 10 percent by weight vinyl acetate and 20 percent by weight glycidyl methacrylate as follows:

| Ingredient | Parts by Weight (in grams) |
|---|---|
| Reactor Charge | |
| Deionized water | 500.0 |
| Ammonium persulfate | 4.28 |
| Pre-Emulsified Monomer Charge | |
| Acrylic polymer soap of Example B | 1199.5 (33.7% solids) |
| Vinyl acetate | 94.32 |
| Glycidyl methacrylate | 188.64 |
| Deionized water | 1166.8 |
| Vinyl chloride | 660.27 |

The latex was prepared as generally described above in Example 8. The properties of the latex are reported in Table II below.

EXAMPLE 13

In this example, 60 percent by weight vinyl chloride was copolymerized with 10 percent by weight vinyl acetate and 30 percent by weight glycidyl methacrylate as follows:

| Ingredient | Parts by Weight (in grams) |
|---|---|
| Reactor Charge | |
| Deionized water | 500 |
| Ammonium persulfate | 4.28 |
| Pre-Emulsified Monomer Charge | |
| Acrylic polymer salt of Example B | 1199.5 (33.7% solids) |
| Vinyl acetate | 94.32 |
| Glycidyl methacrylate | 282.96 |
| Deionized water | 1166.8 |
| Vinyl chloride | 565.96 |

The latex was prepared as generally described in Example 8. The properties of the latex are reported in Table II below.

EXAMPLE 14

In this example, 40 percent by weight vinyl chloride was copolymerized with 10 percent by weight vinyl acetate and 50 percent by weight glycidyl methacrylate as follows:

| Ingredient | Parts by Weight (in grams) |
|---|---|
| Reactor Charge | |
| Deionized water | 500 |
| Ammonium persulfate | 4.28 |
| Pre-Emulsified Monomer Charge | |
| Acrylic polymer salt of Example B | 1448.9 (27.9% solids) |
| Vinyl acetate | 94.32 |
| Glycidyl methacrylate | 471.75 |
| Deionized water | 907.72 |
| Vinyl chloride | 377.40 |

The latex was prepared as generally described above in Example 8. The properties of the latex are reported in Table II below.

TABLE II

Latex Properties of Examples 8-14

| Example No. | % by Weight Vinyl Chloride | % by Weight Vinyl Acetate | % by Weight Glycidyl Methacrylate | Condition of Latex | % Solids | Film Properties[1] | |
|---|---|---|---|---|---|---|---|
| | | | | | | Appearance | Wedge Bend |
| 8 | 89.5 | 10 | 0.5 | good | 34.8 | clear | 21 mm |
| 9 | 87 | 10 | 3 | good | 30.3 | clear | 20 mm |
| 10 | 85 | 10 | 5 | good | 29.7 | clear | 15 mm |
| 11 | 80 | 10 | 10 | good | 34.4 | clear | 26 mm |
| 12 | 70 | 10 | 20 | some coagulation | 34.9 | clear | 28 mm |
| 13 | 60 | 10 | 30 | gelled | — | — | — |
| 14 | 40 | 10 | 50 | gelled | — | — | — |

[1]Latices were thickened and viscosity adjusted as generally described in Table I. Also, 5 percent by weight of an aminoplast crosslinker CYMEL 1116 (from American Cyanamid Co.) was added to the latices.

The results of the experiments summarized in Table II above show that the use of glycidyl methacrylate at levels of 30 percent or more by weight result in coagulation of the latex.

EXAMPLES 15-16

The following Examples 15-16 show the preparation of copolymers of glycidyl methacrylate with monomers other than vinyl chloride. The procedure for preparing the latex copolymers was as generally described above in Examples 8-14 with the exception that the other vinyl monomers were used in place of vinyl chloride.

EXAMPLE 15

In this example, 98 percent by weight vinylidene chloride was copolymerized with 2 percent by weight glycidyl methacrylate as follows:

| Ingredient | Parts by Weight (in grams) |
|---|---|
| Reactor Charge | |
| Deionized water | 500 |
| Azobisisobutyronitrile (VAZO 64 from E. I. du Pont de Nemours) | 10 |
| Pre-Emulsified Monomer Charge | |
| Acrylic polymer salt of Example D | 811.09 (35.6% solids) |
| Vinylidene chloride | 673.5 |
| Glycidyl methacrylate | 13.50 |
| Deionized water | 1780.7 |

The resultant acrylic polymer had a Mw of 178,149.

EXAMPLE 16

In this example, 97 percent by weight styrene was copolymerized with 3 percent by weight glycidyl methacrylate as follows:

| Ingredient | Parts by Weight (in grams) |
|---|---|
| Reactor Charge | |
| Deionized water | 500.0 |
| Ammonium persulfate | 5.0 |
| Pre-Emulsified Monomer Charge | |
| Acrylic polymer salt of Example E | 1167.6 (34.8% solids) |
| Styrene | 943.25 |
| Glycidyl methacrylate | 28.29 |
| Deionized water | 1189.15 |

The resultant acrylic polymer had a Mw of 706,197.

EXAMPLES 17–18

The following Examples 17–18 show the preparation of copolymers of glycidyl methacrylate and styrene by latex polymerization in the presence of salts of carboxylic acid group-containing polyurethanes and salts of carboxylic acid group-containing alkyd resins. The procedure for preparing the latex copolymer was as generally described above in Examples 8–14 with the exception that the polyurethane and alkyd resin salts were in place of the acrylic polymer salts.

EXAMPLE 17

In this example, 97 percent by weight styrene was copolymerized with 3 percent by weight glycidyl methacrylate in the presence of a salt of a carboxylic acid group-containing polyurethane of Example F as follows:

| Ingredient | Parts by Weight (in grams) |
|---|---|
| Reactor Charge | |
| Deionized water | 215.0 |
| Ammonium persulfate | 1.31 |
| Pre-Emulsified Monomer Charge | |
| Polyurethane surfactant of Example F | 434.4 (40.7% solids) |
| Styrene | 254.63 |
| Glycidyl methacrylate | 7.88 |
| Deionized water | 588.8 |

The styrene and glycidyl methacrylate were first pre-emulsified by adding them to a solution of the polyurethane polymer and deionized water. The reactor charge was added to the reactor and heated to 78° C. The pre-emulsified monomer charge was added over a three-hour period, after which the mixture was held for two hours at 78° C. The percent conversion was 84 percent.

Example 18

In this example, 99 percent by weight styrene was copolymerized with 1 percent by weight glycidyl methacrylate in the presence of a salt of the carboxylic acid group-containing alkyd resin of Example G as follows:

| Pre-Emulsified Monomer Charge | |
|---|---|
| Ingredient | Parts by Weight (in grams) |
| Alkyd salt of Example G | 397.05 (34% solids) |
| Styrene | 311.50 |
| Glycidyl methacrylate | 3.15 |
| Deionized water | 707.95 |

The styrene and glycidyl methacrylate were first pre-emulsified by adding them to a solution of the alkyd polymer and deionized water. Three hundred (300) grams of this pre-emulsified monomer charge was added to the reactor and heated to 78° C. Twenty (20) grams of a 10 percent ammonium persulfate solution was added. The mixture was held for ½ hour and then the remaining pre-emulsified monomer charge was added over three hours. The mixture was held for two hours at 78° C. The percentage conversion was 94 percent.

The results of Examples 15–18 show that monomers other than vinyl chloride can be successfully copolymerized with glycidyl methacrylate and that salts of polymers other than acrylic polymers can be used as surfactants in the graft copolymerization process.

We claim:

1. In a process for preparing a polymer in latex form by free radical initiated polymerization of a mixture of polymerizable alpha, beta-ethylenically unsaturated monomers in aqueous medium in the presence of a polymeric surfactant, characterized in that the mixture of polymerizable alpha, beta-ethylenically unsaturated monomers contains from 0.5 to less than 30 percent by weight based on total weight of the mixture of polymerizable alpha, beta-ethylenically unsaturated monomers, of an epoxy group-containing alpha, beta-ethylenically unsaturated monomer, and the polymeric surfactant is a salt of a carboxylic acid group-containing polymer.

2. The process of claim 1 in which the mixture of polymerizable alpha, beta-ethylenically unsaturated monomers includes a monomer selected from the class consisting of alkyl acrylates, alkyl methacrylates, vinylidene halides, vinyl esters of organic acids, alkyl esters of maleic acid, alkyl esters of fumaric acid and mixtures thereof.

3. The process of claim 1 in which the mixture of polymerizable, alpha, beta-ethylenically unsaturated monomers contains from 1 to 20 percent by weight of the epoxy group-containing alpha, beta-ethylenically unsaturated monomer.

4. The process of claim 1 in which the epoxy group-containing alpha, beta-ethylenically unsaturated monomer is selected from the class consisting of glycidyl methacrylate, glycidyl acrylate and mixtures thereof.

5. The process of claim 2 in which the halide of the vinylidene halide is selected from the class consisting of chloride or fluoride.

6. The process of claim 5 in which the vinylidene halide is selected from the class consisting of vinylidene chloride, vinyl chloride, vinylidene fluoride and vinyl fluoride.

7. The process of claim 2 in which the alkyl acrylate and alkyl methacrylate is selected from the class consisting of ethyl acrylate, methyl methacrylate, butyl acrylate and 2-ethylhexylacrylate.

8. The process of claim 2 in which the vinyl ester of an organic acid is vinyl acetate.

9. The process of claim 1 in which the mixture of polymerizable alpha, beta-ethylenically unsaturated monomers is present in amounts of 25 to 75 percent by weight based on weight of the polymerizable alpha, beta-ethylenically unsaturated monomers and salt of a carboxylic acid group-containing polymer.

10. The process of claim 1 in which the salt of the carboxylic acid group-containing polymer is a salt of a carboxylic acid group-containing acrylic polymer.

* * * * *

REEXAMINATION CERTIFICATE (1377th)

United States Patent [19]

Ranka et al.

[11] B1 4,647,612

[45] Certificate Issued  Oct. 23, 1990

[54] POLYMER EMULSION PRODUCTS

[75] Inventors: Ajay I. Ranka, Allison Park; Suryya K. Das, Pittsburgh, both of Pa.

[73] Assignee: PPG Industries Inc., Pittsburgh, Pa.

Reexamination Request:
No. 90/001,854, Oct. 2, 1989

Reexamination Certificate for:
Patent No.: 4,647,612
Issued: Mar. 3, 1987
Appl. No.: 814,458
Filed: Dec. 30, 1985

[51] Int. Cl.$^5$ .................. C08L 33/02; C08L 37/00
[52] U.S. Cl. .................. 524/458; 523/201; 524/460; 524/811

[56] References Cited

U.S. PATENT DOCUMENTS

| | | | |
|---|---|---|---|
| 3,242,123 | 3/1966 | Mayfield et al. | 260/29.6 |
| 3,810,859 | 5/1974 | Mikofalvy | 260/29.6 RW |
| 3,880,793 | 4/1975 | Nakayama | 260/29.6 RW |
| 3,933,706 | 1/1976 | Momiyama et al. | 260/22 S |
| 4,033,920 | 7/1977 | Isozaki et al. | 260/29.6 H |
| 4,064,087 | 12/1977 | Das | 260/29.6 RB |
| 4,100,127 | 7/1978 | Fukusaki et al. | 260/29.6 NR |
| 4,122,052 | 10/1978 | Aihara et al. | 260/23 EM |
| 4,144,155 | 3/1979 | Araki et al. | 204/159.22 |
| 4,151,143 | 4/1979 | Blank et al. | 260/29.6 RW |
| 4,304,701 | 12/1981 | Das et al. | 260/29.6 RW |
| 4,337,185 | 6/1982 | Wessling et al. | 524/458 |
| 4,440,897 | 4/1984 | Maska | 524/460 |
| 4,507,425 | 3/1985 | Weaver | 524/460 |

FOREIGN PATENT DOCUMENTS

| | | | |
|---|---|---|---|
| 2508588 | 9/1975 | Fed. Rep. of Germany | 547/811 |
| 57-18713 | 1/1982 | Japan | 524/811 |
| 58-185604 | 10/1983 | Japan | 524/811 |
| 61-37282 | 8/1986 | Japan . | |

*Primary Examiner*—Edward J. Smith

[57]  ABSTRACT

Polymeric latices formed by free radical initiated polymerization of a polymerizable alpha, beta-ethylenically unsaturated monomer component which contains from 0.1 to less than 30 percent by weight of an epoxy group-containing alpha, beta-ethylenically unsaturated monomer in aqueous medium and in the presence of a salt of an acid group-containing polymer are disclosed. The resultant polymeric latices have higher molecular weights than polymeric latices prepared without the epoxy group-containing alpha, beta-ethylenically unsaturated monomer. The polymeric latices are useful as resinous binders in coating compositions where they provide for excellent adhesion and flexibility in the coating.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-10 are cancelled.

* * * * *